Aug. 28, 1934.  G. HEYMER  1,971,410
APPARATUS FOR PROJECTING MULTICOLOR PICTURES ON LENTICULAR FILMS
Filed Jan. 15, 1932
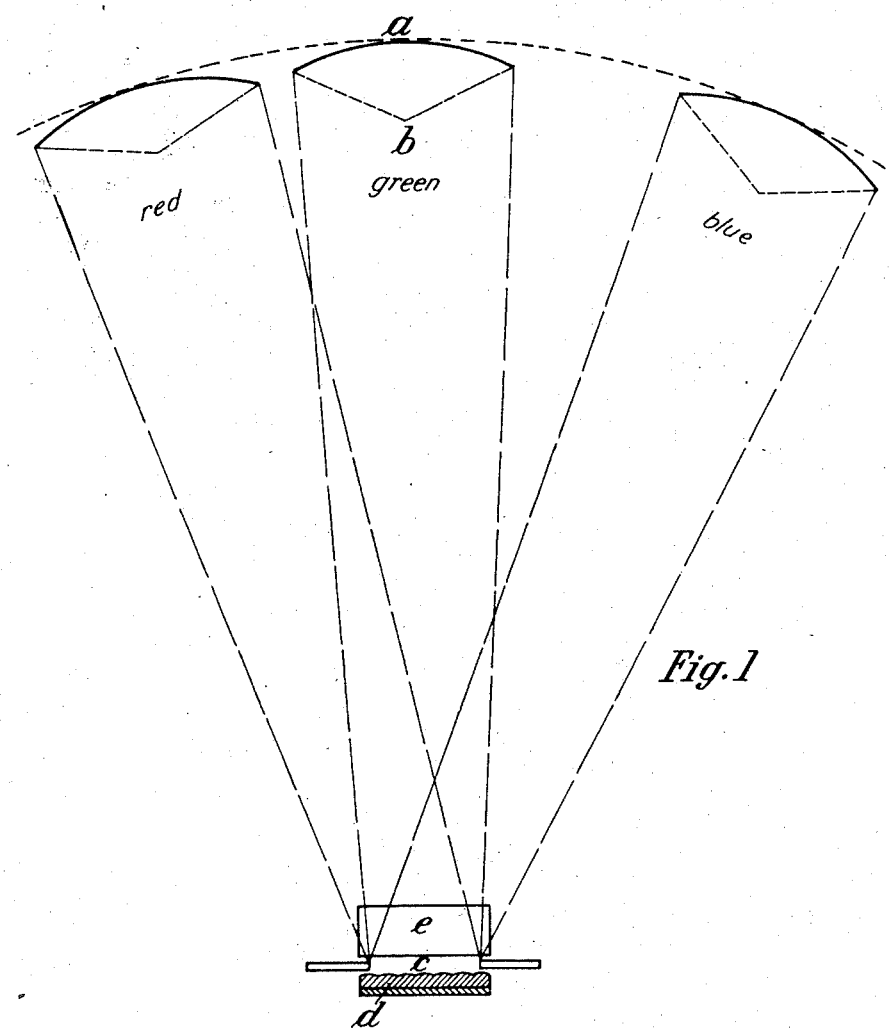
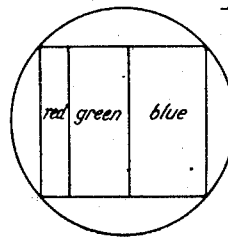
Gerd Heymer,
Inventor;
By Philip S. Hopkins,
Attorney.

Patented Aug. 28, 1934

1,971,410

UNITED STATES PATENT OFFICE 1,971,410

APPARATUS FOR PROJECTING MULTI-COLOR PICTURES ON LENTICULAR FILMS

Gerd Heymer, Dessau in Anhalt, Germany, assignor to Agfa Ansco Corporation, Binghamton, N. Y., a corporation of New York Application January 15, 1932, Serial No. 586,825
In Germany January 17, 1931

4 Claims. (Cl. 88—16.4)

My present invention relates to a device for projecting multi-color pictures on lenticular films.

One of its objects is an improved device which allows of illuminating a lenticular film by inserting a prism in the way of the light rays instead of a multi-color filter. Further objects will be seen from the detailed specification following hereafter, reference being made to the accompanying drawing in which Fig. 1 represents diagrammatically my device when used for projection purposes;

Fig. 2 shows the division of the source of light into its spectral regions by means of the prism inserted into the path of the light rays.

It has repeatedly been proposed to avoid the use of a multi-color filter employed in the known Berthon process for reproducing multi-color pictures on lenticular films by decomposing the white light into its spectral colors. However, the known arrangements for this purpose, involve the drawback that they cause either a loss of light or an uneven illumination of the picture field, or that they require a special course of the light rays unusual in the ordinary apparatus.

I have found that it is possible to decompose the white light into its spectral colors in a manner by which the said drawbacks are eliminated. This method is based on the observation that for producing in the image plane behind each of the lenticular elements of the film a luminous stripe appearing in different colors from one side of the element to the other it is not necessary to interpose a real spectrum (which is produced by projecting an image of the source of light by means of a lens, the beams of light passing a prism before reaching the lens) in the plane that would occupy the multicolor filter. My present invention consists in interposing in the normal path of the beams, in close proximity to the gate aperture, an optical system that disperses the light into its spectral colors, so that the source of the light appears, when viewed from the side of the film, as a spectrum in the plane which would be occupied by the multi-color filter, and of a size that corresponds with that of the multi-color filter.

My device is particularly suited for projecting multi-color picture records on lenticular films.

Fig. 1 shows an arrangement of my device when used in projecting lenticular films. By the mirror or condensor (a) the light of the arc lamp (b) is thrown to the gate aperture (c), behind which the lenticular film (d) is arranged with its embossed side turned towards the source of light.

Directly in front of the gate aperture (c) there is arranged the dispersing element in the form of a direct vision prism (e). In lieu of a single prism (e), there may likewise be employed a plurality of narrow prisms of this kind (as shown for instance in British Specification 24,276 of 1914, Fig. 3), in order to reduce as much as possible the extension of the prisms in the direction of the passage of the beams. The eye placed in the plane of the film (d) sees the virtual image AB (dotted line) of a spectrum; the uniformly bright plane illuminated by white light, which plane in the absence of the prism (e), is visible from the film plane through the gate aperture, has become a plane illuminated by the spectral colors, which, if glass prisms of the ordinary dispersion are employed, is composed of a broad blue zone, a somewhat narrower green zone and a red zone which is still narrower than the green zone The figure shows the direction in which the source of light (in the present case the mirror of the arc lamp) is seen when viewed through the prism, the radiation being supposed to contain only those wave lengths that correspond to the optical centres of the red band, the green band and the blue band of the spectrum. The remaining wave lengths composing the light of the source of light are grouped on both sides of these centres according to the extension of the different zones.

The dimensions of the prism (e) must be such that the breadth of the spectrum corresponds with the breadth of the otherwise required multi-color filter. The prism (e) must disperse the light in such a manner that the colors red, green and blue are visible at a distance from each other allowing the colors to appear pure. The image of the mirror or the condenser (a) corresponding with the wave length 650 $\mu\mu$ must not, for instance, overlap with the image of (a) corresponding with the wave length 550 $\mu\mu$.

The arrangement described involves the advantage that the light dispersing system is placed in close proximity of the gate aperture, so that the passage of the beams need otherwise not be altered, and that the light dispersing system may be kept within comparatively small dimensions. Moreover, its illuminating device, the condenser or the mirror of the source of light must be adapted to the breadth of the multi-color filter which would be required for projecting the film in the usual manner, is independent of the arrangement of the apparatus. It is, of course, also possible to construct the light dispersing system in some other form than that here indicated;

for instance there may be used a triangular prism or a set of such prisms, the path of beams of light being changed correspondingly.

Most of the prismatic aggregates disperse the light in such a manner that the blue part of the spectrum is considerably larger than, for instance, the red part. This is compensated by applying the arrangement according to my invention, in taking the pictures as well as in projecting them. If, however, a lenticular film produced by means of the usual three color filter is to be projected by the method of my invention, it is necessary to employ, in taking the pictures, a three-color filter that corresponds with this peculiarity of the spectrum produced by a prism, that is to say the three-color filter must comprise a very large blue stripe and a comparatively narrow red stripe (see Fig. 2).

What I claim is:

1. In an apparatus for projecting lenticular film, in operative combination, a gate having an aperture, a lenticular film arranged behind said aperture, means for illuminating said film arranged at a distance from said film corresponding with that at which the multi-color filter was arranged from the original in taking, a light dispersing element arranged near said gate between said gate and said illuminating means, said dispersing means having such dimensions as to produce in co-operation with said illuminating means the virtual image of a spectrum equal in size to the multi-color filter used in taking the original the taking filter having the breadth of its color stripes corresponding with the distribution of the colors in the produced spectrum.

2. In an apparatus for projecting lenticular film, in operative combination, a gate having an aperture, a lenticular film arranged behind said aperture, means for illuminating said film arranged at a distance from said film corresponding with that at which the multi-color filter was arranged from the original in taking, a direct vision prism arranged near said gate between said gate and said illuminating means, said direct vision prism having such dimenisons as to produce in co-operation with said illuminating means the virtual image of a spectrum equal in size to the multi-color filter used in taking the original the taking filter having the breadth of its color stripes corresponding with the distribution of the colors in the produced spectrum.

3. In an apparatus for projecting lenticular film, in operative combination, a gate having an aperture, a lenticular film arranged behind said aperture, a mirror, a source of light illuminating said mirror, said mirror being arranged at a distance from said film corresponding with that at which the multi-color was arranged from the original in taking and projecting said source of light on said film, a direct vision prism arranged near said gate between said gate and said mirror, said prism having such dimensions as to produce with said illuminated mirror the virtual image of a spectrum equal in size to the multi-color filter used in taking the original, the taking filter having the breadth of its color stripes corresponding with the distribution of the colors in the produced spectrum.

4. In an apparatus for projecting lenticular film, in operative combination, a gate having an aperture, a lenticular film arranged behind said aperture, a condenser, a source of light illuminating said condenser, said condenser being arranged at a distance from said film corresponding with that at which the multi-color was arranged from the original in taking and projecting said source of light on said film, a direct vision prism arranged near said gate between said gate and said condenser, said prism having such dimensions as to produce with said illuminated condenser the virtual image of a spectrum equal in size to the multi-color filter used in taking the original, the taking filter having the breadth of its color stripes corresponding with the distribution of the colors in the produced spectrum.

GERD HEYMER.